United States Patent
Dhuse (10) Patent No.: US 10,289,318 B2
(45) Date of Patent: May 14, 2019

(54) ADJUSTING OPTIMISTIC WRITES IN A DISPERSED STORAGE NETWORK

(71) Applicant: International Business Machines Corporation, Armonk, NY (US)

(72) Inventor: Greg R. Dhuse, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 15/238,165

(22) Filed: Aug. 16, 2016

(65) Prior Publication Data

US 2016/0357467 A1     Dec. 8, 2016

Related U.S. Application Data (63) Continuation-in-part of application No. 13/270,528, filed on Oct. 11, 2011.

(60) Provisional application No. 61/408,980, filed on Nov. 1, 2010.

(51) Int. Cl.
*G06F 7/00* (2006.01)
*G06F 3/06* (2006.01)
*H04L 29/08* (2006.01)
*G06F 17/00* (2019.01)

(52) U.S. Cl.
CPC ............ *G06F 3/0619* (2013.01); *G06F 3/061* (2013.01); *G06F 3/064* (2013.01); *G06F 3/067* (2013.01); *G06F 3/0635* (2013.01); *G06F 3/0659* (2013.01); *H04L 67/1097* (2013.01); *G06F 2212/7205* (2013.01)

(58) Field of Classification Search
CPC ...... G06F 3/0619; G06F 3/061; G06F 3/0659; G06F 3/067
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Kannan Shanmugasundaram
(74) *Attorney, Agent, or Firm* — Garlick & Markison; Timothy W. Markison; Timothy D. Taylor (57) ABSTRACT

A method includes encoding a data object into a plurality of sets of encoded data slices. The method further includes commencing execution of a plurality of three-phase write operations for writing the plurality of sets of encoded data slices to a set of storage units. The method further includes, during execution of the three-phase write operations, determining write speed differences between storage units of the set of storage units. The method further includes determining whether the write speed differences are having an adverse effect of the execution of the three-phase write operations. The method further includes, when the write speed differences are having the adverse effect, adjusting subsequent three-phase write operations by one or more of: throttling back write operations to a faster storage unit of the set of storage units and dropping write operations to a slower storage unit of the set of storage units.

16 Claims, 8 Drawing Sheets

(56) References Cited

U.S. PATENT DOCUMENTS

| | | | |
|---|---|---|---|
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 1511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

ADJUSTING OPTIMISTIC WRITES IN A DISPERSED STORAGE NETWORK

CROSS-REFERENCE TO RELATED APPLICATIONS

The present U.S. Utility Patent Application claims priority pursuant to 35 U.S.C. § 120 as a continuation-in-part of U.S. Utility application Ser. No. 13/270,528, entitled "COMPACTING DISPERSED STORAGE SPACE", filed Oct. 11, 2011, which claims priority pursuant to 35 U.S.C. § 119(e) to U.S. Provisional Application No. 61/408,980, entitled "DISPERSED STORAGE NETWORK COMMUNICATION", filed Nov. 1, 2010, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage. Improving the writing of data to and the reading of data from cloud storage is an on-going challenge.

DETAILED DESCRIPTION OF THE INVENTION

Figure 1:
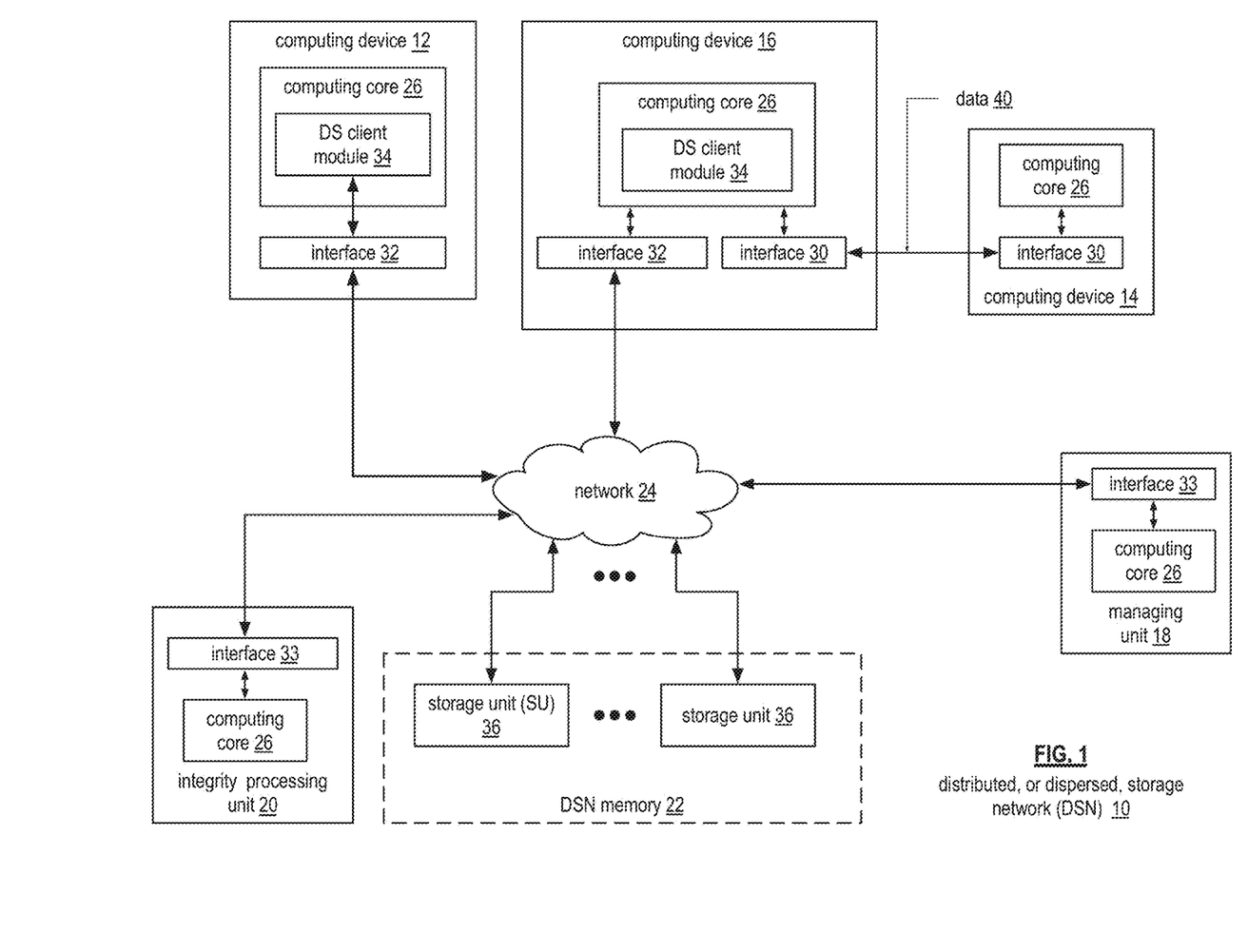
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
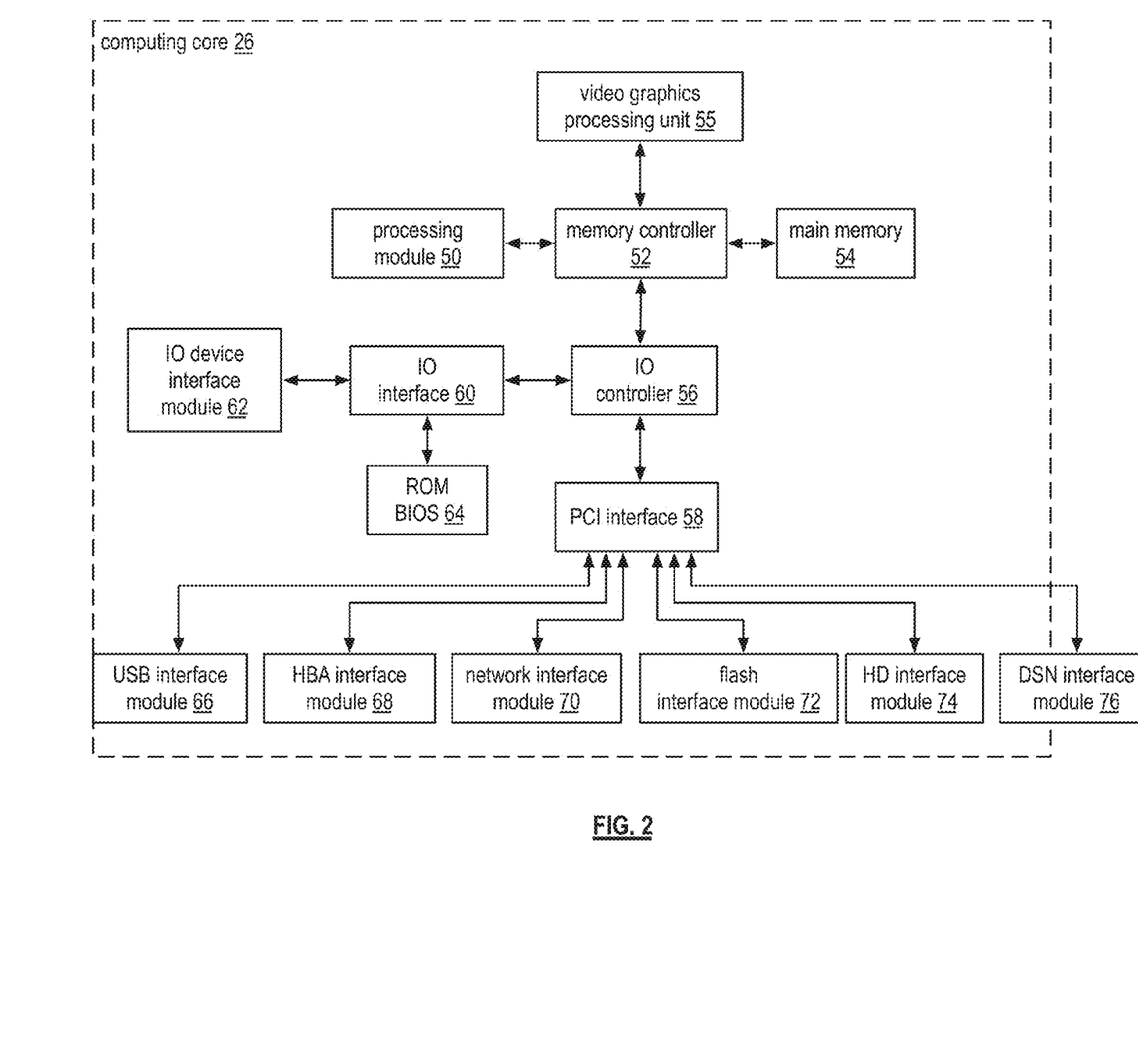
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
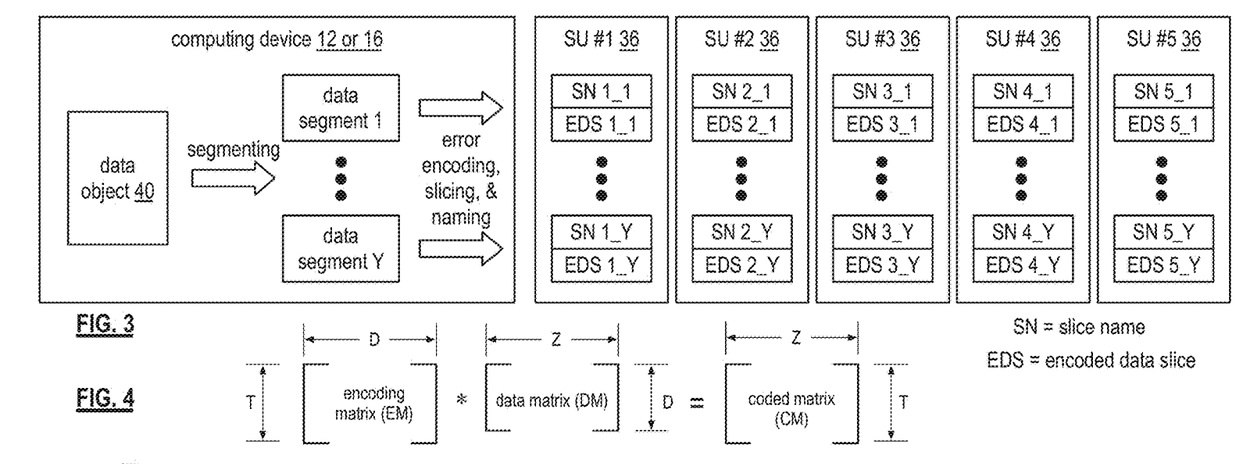
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figures 5, 6:
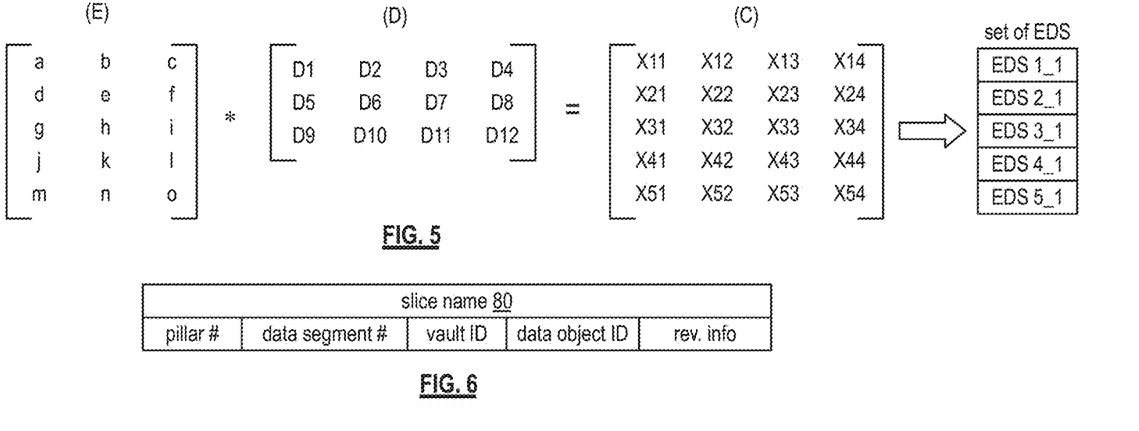
FIG. 5 is a schematic block diagram of a specific example of an error encoding function in accordance with the present invention.
FIG. 6 is a schematic block diagram of an example of a slice name of an encoded data slice (EDS) in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
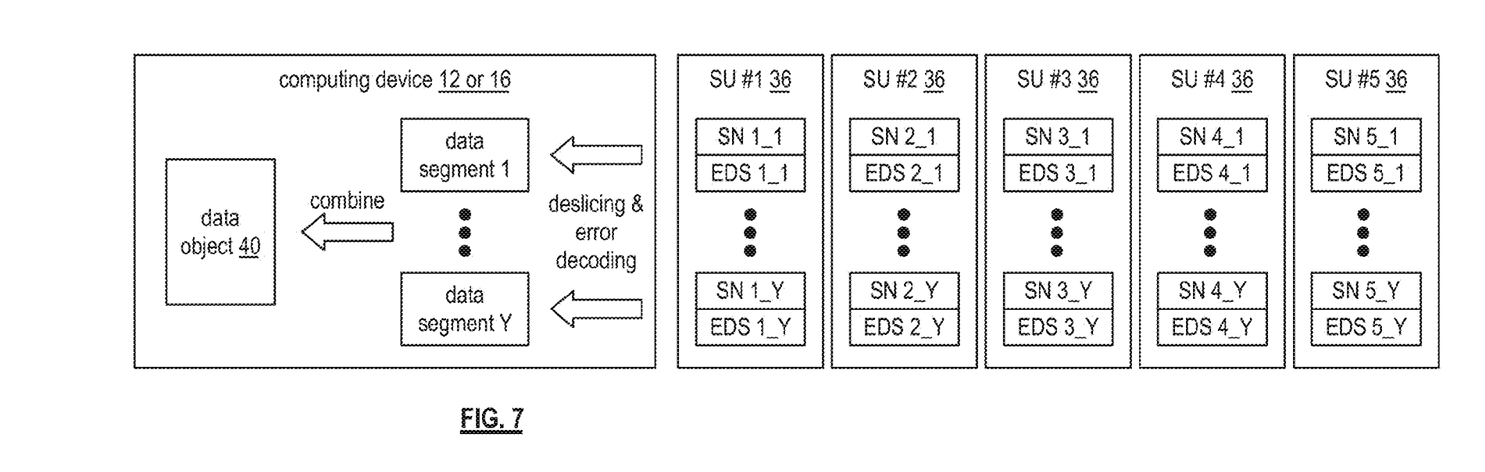
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
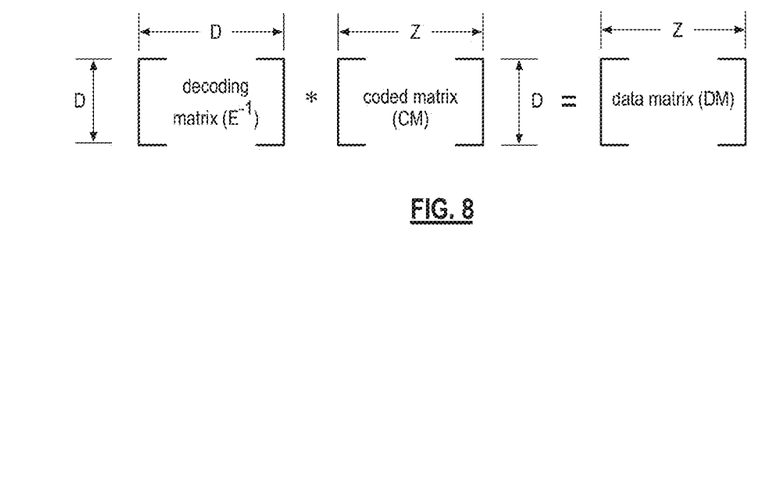
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
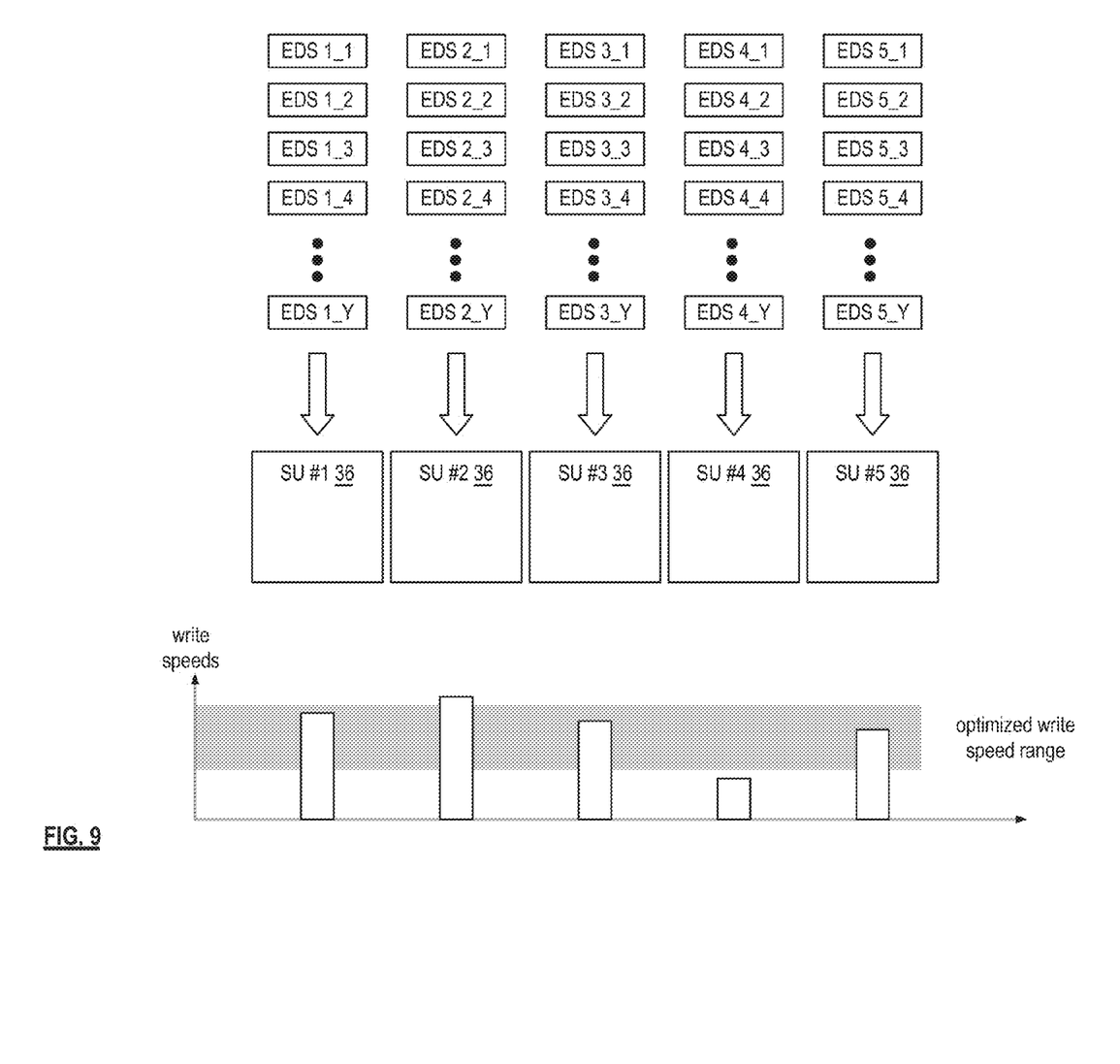
FIG. 9 is a schematic block diagram of an embodiment of adjusting optimistic writes in a DSN in accordance with the present invention.

FIG. 9 is a schematic block diagram of adjusting optimistic writes in the DSN. In this example, the computing device (12 or 16) encode a data object into a plurality of sets of encoded data slices (EDS 1_1-EDS 5_1 through EDS 1_Y-EDS 5_Y). Each encoded data slice is, in effect, a separate piece of data written to a specific storage unit. The writing of an encoded data slice to a storage unit will have a writing speed that is dependent on a variety of factors including, but not limited to, available memory in the storage unit, network traffic, data processing throughput of the storage unit, network latency issues, and distance between computing device and the storage unit. As such, from storage unit to storage unit, there is likely to be different write speeds (e.g., one storage unit has a faster write speed than another).

In addition, the writing operation for a set of encoded data slices is a three-phase process. The first phase is a write phase in which the computing device sends a set of write requests to the set of storage units (e.g., SU 1-SU 5) regarding the set of encoded data slices (e.g., EDS 1_2 through EDS 5_2). For each storage unit that receives a corresponding one of the write requests, it temporarily stores the corresponding encoded data slice and keeps it invisible (i.e., it cannot be read). Upon successful temporary storage of an EDS, the storage unit sends a favorable write response to the computing device. Note that unsuccessful storage may result when the storage unit does not receive the request, it receives a corrupted request, and/or receives a corrupted EDS.

When the computing device receives a write threshold number of favorable write responses (e.g., 4 in this example), it commences with the second phase by sending a set of write commit requests to the storage units. For each storage unit that receives a corresponding one of the write commit requests, it makes its corresponding encoded data slice visible (i.e., it can be read). In addition, the storage unit sends a write commit response to the storage unit, which indicates that the encoded data slice is visible.

When the computing device receives a write threshold number of favorable write commit responses, it commences with the third phase by sending a set of write finalize requests to the storage units. For each storage unit that receives a corresponding one of the write finalize requests, it permanently stores makes its corresponding encoded data slice and may dispose of an older version of the encoded data slice. In addition, the storage unit sends a write finalize response to the storage unit, which indicates that the encoded data slice is visible. Note that, due to the different write speeds of the storage units, one storage unit may be processing one phase of a write operation while another storage unit is processing a different phase of the write operation. Further note that the computing device determines a storage unit's write speed by interpreting response times of the storage units for one or more phases of one or more write operations.

The speed at which a set of encoded data slices can be stored is dictated by the slowest storage units to response to the current phase of the write operation. In an ideal DSN, every encoded data slice of every set of encoded data slices would be accurately stored during the write operation. This ideal storage of encoded data slices may be at the cost of storage efficiency, hence the inclusion of the write threshold. To optimize storage efficiency in the DSN, the computing device, during execution of the three-phase write operations for the plurality of sets of encoded data slices, determine write speeds for each of the storage units and write speed differences between them. The bottom of FIG. 9 illustrates example write speeds for storage units 1-5.

The computing device determines whether the write speed differences are having an adverse effect of the execution of the three-phase write operations. For example, is one or more storage units outside of a user defined minimum write speed (i.e., not within an optimized write speed range). As another example, is one storage unit's write speed being a standard deviation slower than another storage unit's write speed (e.g., storage unit 4's speed is less than ½ the speed of storage unit 2). As yet another example, are the speeds not within a specified level of a quality of service to minimize dropping of data segments and maintain a minimum level of throughput.

When the write speed differences are having the adverse effect of the execution of the three-phase write operations (e.g., not providing the desired quality of service), the computing device adjusts subsequent three-phase write operations by throttling back write operations to a faster storage unit of the set of storage units (e.g., slowing down write operations to storage unit 2) and/or dropping write operations to a slower storage unit of the set of storage units (e.g., dropping write operations to storage unit 4).

Figure 10:
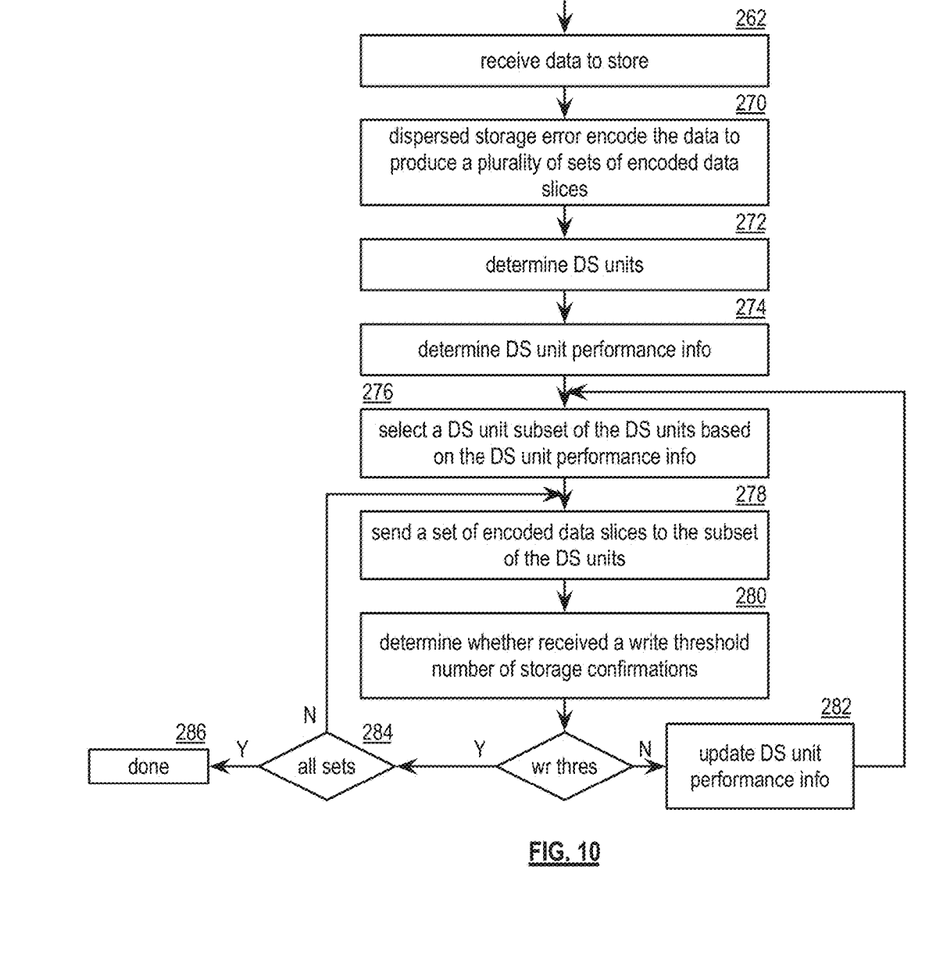
FIG. 10 is a logic diagram of an example of a method of storing data in a DSN in accordance with the present invention.

FIG. 10 is a flowchart illustrating an example of storing data, which begins with step 262 where a processing module receives data to store. The method continues at step 270 where the processing module dispersed storage error encodes the data to produce a plurality of sets of encoded data slices. The method continues at step 272 where the processing module determines dispersed storage (DS) units based on one or more of an available DS unit list, a pillar list, preferred DS units, a virtual dispersed storage network (DSN) address to physical location table lookup, a query, and a message. The method continues at step 274 where the processing module determines DS unit performance information for the DS units. The performance information may include information of one or more of latency, bandwidth, speed, availability, and reliability. The determination may be based on one or more of the DS units, a lookup, a query, a history record, and a message.

The method continues at step 276 where the processing module selects a DS unit subset of the DS units based on the DS unit performance information. The DS unit subset may have at least a write threshold number of DS units. For example, the processing module selects DS units of the subset that have a fastest storage response time. As another example, the processing module selects DS units of the subset based on matching a bandwidth of data being received to a bandwidth performance of selected DS units.

The method continues at step 278 where the processing module sends a set of encoded data slices to the subset of the DS units. For example, the processing module places the encoded data slices in a transmit queue intended to subsequently be transmitted to the DS units. The method continues at step 280 where the processing module determines whether the processing module has received a write threshold number of storage confirmations. The method branches to step 284 when the processing module determines that a write threshold number of storage confirmations have been received for the current set. The method continues to step 282 when the processing module determines that a write threshold number of storage confirmations have not been received for the current set. The method continues at step 282 where the processing module updates the DS unit performance information. The updating may include noting which DS units performed the poorest (e.g., which did not confirm a write slice). The method repeats back to step 276 to select a new DS unit subset.

The method continues at step 284 where the processing module determines if all sets have been processed when a write threshold number of storage confirmations have been received. The method repeats back to step 278 when the processing module determines that all sets have not been processed. The method ends at step 286 when the processing module determines that all sets have been processed.

Figure 11:
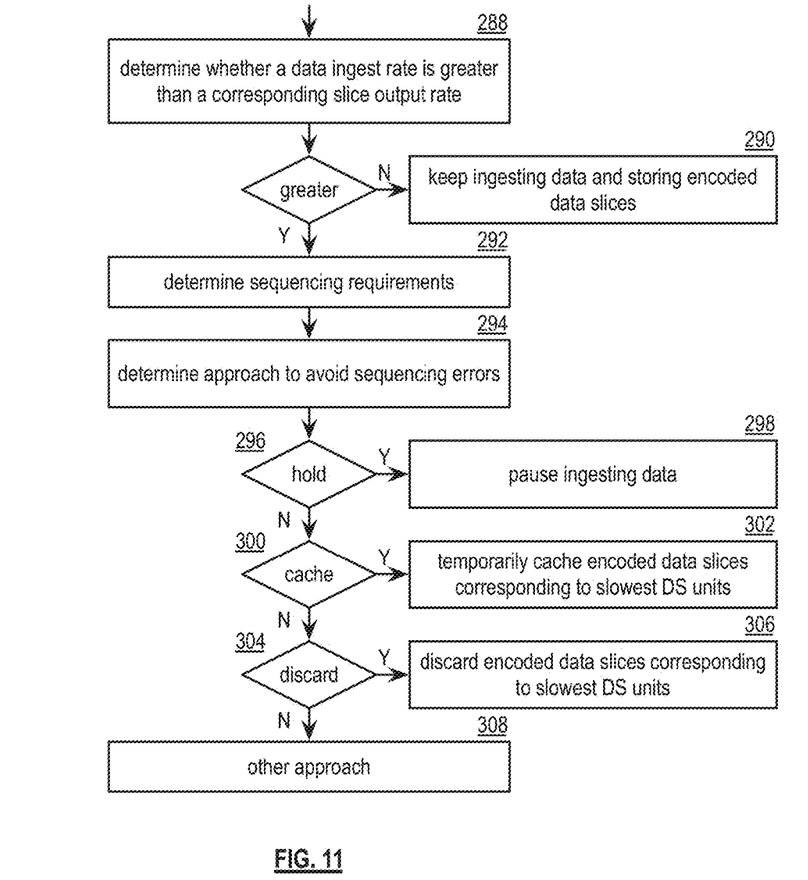
FIG. 11 is a logic diagram of another example of a method of storing data in a DSN in accordance with the present invention.

FIG. 11 is another flowchart illustrating another example of storing data. The method begins with step 288 where a processing module (e.g., of a dispersed storage (DS) processing unit) determines whether a data ingest rate is greater than a corresponding slice output rate. For example, the processing module determines whether slices being encoded from a video stream being ingested can keep up with the video stream input based on comparing an output rate to an input rate. The method branches to step 292 when the processing module determines that the data ingest rate is greater than the corresponding slice output rate. The method continues to step 290 when the processing module determines that the data ingest rate is not greater than the corresponding slice output rate. The method continues at step 290 where the processing module keeps ingesting data and storing encoded data slices.

The method continues at step 292 where the processing module determines sequencing requirements when the processing module determines that the data ingest rate is greater than the corresponding slice output rate. The sequencing requirements may include indicators for one or more of never stop ingesting, okay to stop ingesting, okay to rebuild later, not okay to rebuild later, minimum write speed, quality of service level, a data size indicator, and a minimum throughput level. The determination may be based on one or more of a data store request message, a lookup, a user identity, a data identifier, a message, and a command.

The method continues at step 294 where the processing module determines an approach to avoid sequencing errors. The determination may be based on one or more of dispersed storage (DS) units utilized to store the encoded data slices, performance of the DS units, the sequencing requirements, attributes of the approaches to avoid sequencing errors, comparing the sequencing requirements to attributes of approaches to avoid the sequencing errors and comparing the sequencing requirements to the performance of the DS units. For example, the processing module determines the approach to avoid sequencing errors to include holding the input when the sequencing requirements includes an indicator that indicates that it is okay to stop ingesting. As another example, the processing module determines the approach to avoid sequencing errors to include caching the input when the sequencing requirements includes an indicator that indicates that it is not okay to stop ingesting and caching memory is available to store the data based on the data size indicator. As yet another example, the processing module determines the approach to avoid sequencing errors to include discarding encoded data slices when the sequencing requirements includes an indicator that indicates a quality of service level that is compatible with discarding at least some of the encoded data slices.

The method continues at step 296 where the processing module determines whether to utilize the hold approach to avoid sequencing errors based on the determined approach. The method branches to step 300 when the processing module determines not to utilize the hold approach. The method continues to step 298 when the processing module determines to utilize the hold approach. The method continues at step 298 where the processing module pauses ingesting data.

The method continues at step 300 where the processing module determines whether to utilize the caching approach to avoid sequencing errors based on the determined approach. The method branches to step 304 when the processing module determines not to utilize the caching approach. The method continues to step 302 when the processing module determines to utilize the caching approach. The method continues at step 302 where the processing module temporarily caches encoded data slices corresponding to DS units identified as slowest DS units.

The method continues at step 304 where the processing module determines whether to utilize the discarding approach to avoid sequencing errors based on the determined approach. The method branches to step 308 when the processing module determines not to utilize the discarding approach. The method continues to step 306 when the processing module determines to utilize the discarding approach. The method continues at step 306 where the processing module discards encoded data slices corresponding to slowest DS units. The processing module may subsequently invoke a rebuilding process if at least a write threshold number of slices are stored. In addition, the processing module may stop throttling the writing of slices to faster DS units.

The method continues at step 308 where the processing module utilizes another approach when the processing module determines not to utilize the discarding approach. The another approach may include one or more of doing nothing, adding resources, selecting different DS units, utilizing a different network connection to a DS unit, changing error encoding dispersal storage function parameters to reduce output bandwidth, and issuing an error message.

Figure 12:
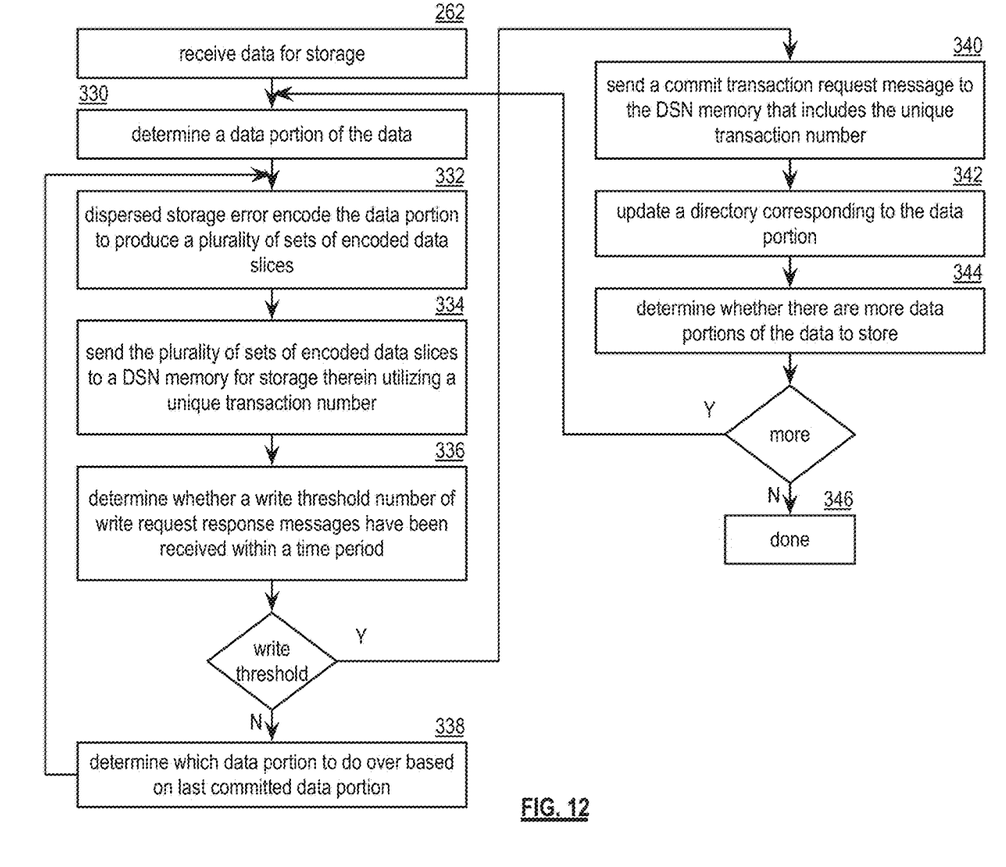
FIG. 12 is a logic diagram of an example of a method of storing data in a DSN in accordance with the present invention.

FIG. 12 is another flowchart illustrating another example of storing data, which begins with step 262 where a processing module receives data for storage. The method continues at step 330 where the processing module determines a data portion of the data. The data portion may include one or more data segments as a function of a size of the data. The determination may be based on one or more of a size indicator of the data, a lookup, a predetermination, a message, an estimated time to store, and a time threshold. The method continues at step 332 where the processing module dispersed storage error encodes the data portion to produce a plurality of sets of encoded data slices.

The method continues at step 334 where the processing module sends the plurality of sets of encoded data slices to a dispersed storage network (DSN) memory for storage therein utilizing a unique transaction number corresponding to the data portion (e.g., as compared to other plurality of sets of encoded data slices for other data portions). The method continues at step 336 where the processing module determines whether a write threshold number of write request response messages have been received within a time period. The method branches to step 340 when the processing module determines that the write threshold number of write request response messages have been received within the time period. The method continues to step 338 when the processing module determines that the write threshold number of write request response messages have not been received within the time period. The method continues at step 338 where the processing module determines which data portion to do over based on a last committed data portion. For example, the processing module determines to do over a data portion that follows a last committed data portion. The method repeats back to step 332 where the processing module dispersed storage error encodes the data portion to do over.

The method continues at step 340 where the processing module sends a commit transaction request message to the DSN memory that includes the unique transaction number when the processing module determines that the write threshold number of write request response messages have been received within the time period. The method continues at step 342 where the processing module updates a directory corresponding to the data portion. The updating indicates that the data portion is committed. The process can be picked up again later in the next data portion if the process is interrupted.

The method continues at step 344 where the processing module determines whether there are more data portions of the data to store. The determination may be based on comparing a list of data portions to a list of data portion stored so far. The method repeats back to step 330 when the processing module determines that there are more data portions of the data to store. The method ends at step 346 when the processing module determines that there are no more data portions of the data to store.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue"

indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
dispersed storage error encoding, by a computing device of a dispersed storage network (DSN), a data object to produce a plurality of sets of encoded data slices;
executing, by the computing device, a plurality of three-phase write operations for writing the plurality of sets of encoded data slices to a set of storage units of the DSN, wherein, a phase of a three-phase write operation of the plurality of three-phase write operations includes a set of write requests regarding a set of encoded data slices of the plurality of sets of encoded data slices, wherein a write threshold number of favorable responses is required from the set of storage units to complete the a phase of the three-phase write operation and to begin a subsequent phase of the three-phase write operation or a first phase of another three-phase write operation of the plurality of three-phase write operations;
during execution of the three-phase write operation of the plurality of three-phase write operations: determining, by the computing device, a write speed of a storage unit of the set of storage units, in processing a write request of the set of write requests, is outside a write speed range, wherein the write speed range includes one or more of a user defined write speed range, one storage unit's write speed being a standard deviation difference than another storage unit's write speed, and a specified level of a quality of service;
determining, by the computing device, whether the write speed of the storage unit being outside the write speed range is decreasing performance of the execution of the plurality of three-phase write operations; and
when the write speed is decreasing the performance:
adjusting, by the computing device, for one or more subsequent phases of the plurality of three-phase write operations, the execution of one or more subsequent write requests for the storage unit, wherein the adjustment causes write speeds, for the set of storage units, in executing the one or more subsequent phases, to be within the write speed range, and wherein the adjustment includes one or more of:
throttling back the one or more subsequent write requests to the storage unit; and dropping the one or more subsequent write requests to the storage unit.

2. The method of claim 1 further comprises:
executing, by the computing device, a first phase of the three-phase write operation by:
sending a first set of write requests to the set of storage units regarding a first set of encoded data slices of the plurality of sets of encoded data slices, wherein a first write request of the first set of write requests is regarding a first encoded data slice of the first set of encoded data slices and is sent to a first storage unit of the set of storage units;
receiving at least the write threshold number of favorable write responses from at least some storage units of the set of storage units; and
determining response times for the at least some storage units regarding the first phase.

3. The method of claim 2 further comprises:
interpreting, by the computing device, the response times for the at least some storage units of the set of storage units for execution of the first phase of one or more of the plurality of three-phase write operations to determine the write speeds for the at least some storage units.

4. The method of claim 2 further comprises:
executing, by the computing device, a second phase of the three-phase write operation by:
sending a set of write commit requests to the set of storage units regarding the first set of encoded data slices, wherein a first write commit request of the set of write commit requests is regarding the first encoded data slice and is sent to the first storage unit;

receiving at least the write threshold number of favorable write commit responses from at least some storage units of the set of storage units; and determining second response times for the at least some storage units regarding the second phase.

5. The method of claim 4 further comprises:

interpreting, by the computing device, the second response times for the at least some storage units for execution of the second phase of one or more of the plurality of three-phase write operations to determine second write speeds for the at least some storage units.

6. The method of claim 2 further comprises:

executing, by the computing device, a third phase of the three-phase write operation by:

sending a set of write finalize requests to the set of storage units regarding the first set of encoded data slices, wherein a first write finalize request of the set of write finalize requests is regarding the first encoded data slice and is sent to the first storage unit;

receiving at least the write threshold number of favorable write finalize responses from at least some storage units of the set of storage units; and determining third response times for the at least some storage units regarding the third phase.

7. The method of claim 6 further comprises:

interpreting, by the computing device, the third response times for the at least some of the sets of storage units for execution of the third phase of one or more of the plurality of three-phase write operations to determine third write speeds for the at least some storage units.

8. The method of claim 1, where the determining whether the write speed of the storage unit being outside the write speed range is decreasing performance comprises one or more of:

determining, that due to the write speed, one or more write requests of the plurality of three-phase write operations are being dropped;

determining a difference in the write speed between storage units of the set of storage units is causing a phase write speed for executing the phase of the three-phase operation to be less than a phase write speed threshold; and determining that a current level of throughput for the plurality of three-phase write operations is below a minimum level of throughput.

9. A computing device of a dispersed storage network (DSN), wherein the computing device comprises:

an interface;

memory; and a processing module operably coupled to the interface and the memory, wherein the processing module is operable to:

dispersed storage error encode, a data object to produce a plurality of sets of encoded data slices;

executing a plurality of three-phase write operations for writing the plurality of sets of encoded data slices to a set of storage units of the DSN, wherein, a phase of a three-phase write operation of the plurality of three-phase write operations includes a set of write requests regarding a set of encoded data slices of the plurality of sets of encoded data slices, wherein a write threshold number of favorable responses is required from the set of storage units to complete a phase of the three-phase write operation and to begin a subsequent phase of the three-phase write operation or a first phase of another three-phase write operation of the plurality of three-phase write operations;

during execution of the three-phase write operation of the plurality of three-phase write operations:

determine a write speed of a storage unit of the set of storage units, in processing a write request of the set of write requests, is outside a write speed range, wherein the write speed range includes one or more of a user defined write speed range, one storage unit's write speed being a standard deviation difference than another storage unit's write speed, and a specified level of a quality of service;

determine whether the write speed of the storage unit being outside the write speed range is decreasing performance of the execution of the plurality of three-phase write operations; and when the write speed is decreasing the performance:

adjust for one or more subsequent phases of the plurality of three-phase write operations, the execution of one or more subsequent write requests for the storage unit, wherein the adjustment causes write speeds, for the set of storage units, in executing the one or more subsequent phases, to be within the write speed range, and wherein the adjustment includes one or more of throttling back the one or more subsequent write requests to the storage unit; and dropping the one or more subsequent write requests to the storage unit.

10. The computing device of claim 9, wherein the processing module is further operable to:

execute a first phase of the three-phase write operation by:

sending, via the interface, a first set of write requests to the set of storage units regarding a first set of encoded data slices of the plurality of sets of encoded data slices, wherein a first write request of the first set of write requests is regarding a first encoded data slice of the first set of encoded data slices and is sent to a first storage unit of the set of storage units;

receiving, via the interface, at least the write threshold number of favorable write responses from at least some storage units of the set of storage units; and determining response times for the at least some storage units regarding the first phase.

11. The computing device of claim 10, wherein the processing module is further operable to:

interpret the response times for the at least some storage units of the set of storage units for execution of the first phase of one or more of the plurality of three-phase write operations to determine write speeds for the at least some storage units.

12. The computing device of claim 10, wherein the processing module is further operable to:

execute a second phase of the three-phase write operation by:

sending, via the interface, a set of write commit requests to the set of storage units regarding the first set of encoded data slices, wherein a first write commit request of the set of write commit requests is regarding the first encoded data slice and is sent to the first storage unit;

receiving, via the interface, at least the write threshold number of favorable write commit responses from at least some storage units of the set of storage units; and determining second response times for the at least some storage units regarding the second phase.

13. The computing device of claim 12, wherein the processing module is further operable to:
  interpret the second response times for the at least some storage units for execution of the second phase of one or more of the plurality of three-phase write operations to determine second write speeds for the at least some storage units.

14. The computing device of claim 10, wherein the processing module is further operable to:
  execute a third phase of the three-phase write operation by:
    sending, via the interface, a set of write finalize requests to the set of storage units regarding the first set of encoded data slices, wherein a first write finalize request of the set of write finalize requests is regarding the first encoded data slice and is sent to the first storage unit;
    receiving, via the interface, at least the write threshold number of favorable write finalize responses from at least some storage units of the set of storage units; and
    determining third response times for the at least some storage units regarding the third phase.

15. The computing device of claim 14, wherein the processing module is further operable to:
  interpret the third response times for the at least some of the sets of storage units for execution of the third phase of one or more of the plurality of three-phase write operations to determine third write speeds for the at least some storage units.

16. The computing device of claim 9, wherein the processing module is further operable to determine whether the write speed of the storage unit being outside the write speed range is decreasing performance by one or more of:
  determining, that due to the write speed, one or more write requests of the plurality of three-phase write operations are being dropped;
  determining a difference in the write speed between storage units of the set of storage units is causing a phase write speed for executing the phase of the three-phase operation to be less than a phase write speed threshold; and
  determining that a current level of throughput for the plurality of three-phase write operations is below a minimum level of throughput.

\* \* \* \* \*